Nov. 11, 1958   J. R. RENARD   2,859,890
MOBILE MECHANICAL HANDLING DEVICE
Filed April 22, 1954   2 Sheets-Sheet 2

INVENTOR
JOFFRE ROBERT RENARD
By Irvin S. Thompson
ATTY.

United States Patent Office 2,859,890
Patented Nov. 11, 1958

2,859,890

MOBILE MECHANICAL HANDLING DEVICE

Joffre Robert Renard, Paris, France, assignor to Societe Th. Pernin & Fils, Montreuil-Sous-Bois, France, a corporation of the French Republic Application April 22, 1954, Serial No. 424,974

Claims priority, application France April 29, 1953

2 Claims. (Cl. 214—670)

The present invention relates to a mechanical handling device of the type comprising a mobile chassis on which is mounted a mast supporting a platform which slides up and down, said chassis being mounted on wheels, generally a driving and steering wheel and two carrier wheels arranged in the vicinity of the mast.

Devices of this type are used for numerous types of work, particularly in construction work for transporting the concrete necessary for making walls or floors. In this application, the load of concrete carried by the platform has to be able to be raised to a relatively considerable height, of the order of 3 m50. The device tends to be given a large wheel-base in order to meet the requirements of equilibrium when in use. But this large wheel-base has the disadvantage of affecting the manoeuvrability of the device. If a device with a small wheel-base is employed, there is a risk of upsetting the equilibrium. This fault can be corrected by counterweights but these have the disadvantage of increasing the dead weight of the device during handling, which is particularly undesirable when it is a question of a supported floor during the construction of a building.

In order to overcome this disadvantage it has been suggested that the chassis should be made in two parts which can slide in relation to one another. One part of the chassis carries the driving and steering wheel, while the other part, joined to the carrier wheels, carries the mast and the loading platform.

This solution makes the wheel-base of the device variable and adjustable and provides the possibility of suiting this wheel-base to the weight of the loads and the height of the work, while restoring it to a reduced value for transport. But it has the disadvantage of a complicated construction which is still heavy. Moreover, since the mast is rigidly secured to the mobile portion of the chassis, it necessitates the displacements of the latter, with the platform and the load, when the wheel-base is altered.

The present invention has its object to provide a more simple device better adapted to use and avoiding these disadvantages.

It consists of a device of the type in question, that is to say comprising a chassis with a mast having a platform mounted on a driving and steering wheel and carrier wheels, characterised in that the carrier wheels are mounted to slide on the chassis.

In this construction only the carrier wheels are displaceable. The chassis of the device is a single member and the mast is mounted on the chassis, remaining in a fixed position in relation thereto.

The displacement of the carrier wheels can be obtained by any appropriate power means, preferably, by one or more hydraulic jacks acting on the slide-ways on which the carrier wheels are mounted.

This method of constructing the mechanical handling device forming the subject of the invention makes it possible to reconcile stability, whatever the height to which the load is raised, with great lightness, due to the absence of any counterweights or any complicated mechanism.

The accompanying drawings show, by way of non-limiting example, one embodiment of the device according to the invention.

Figure 3 shows diagrammatically the distribution of fluid under pressure in the control jack.

Figure 1:
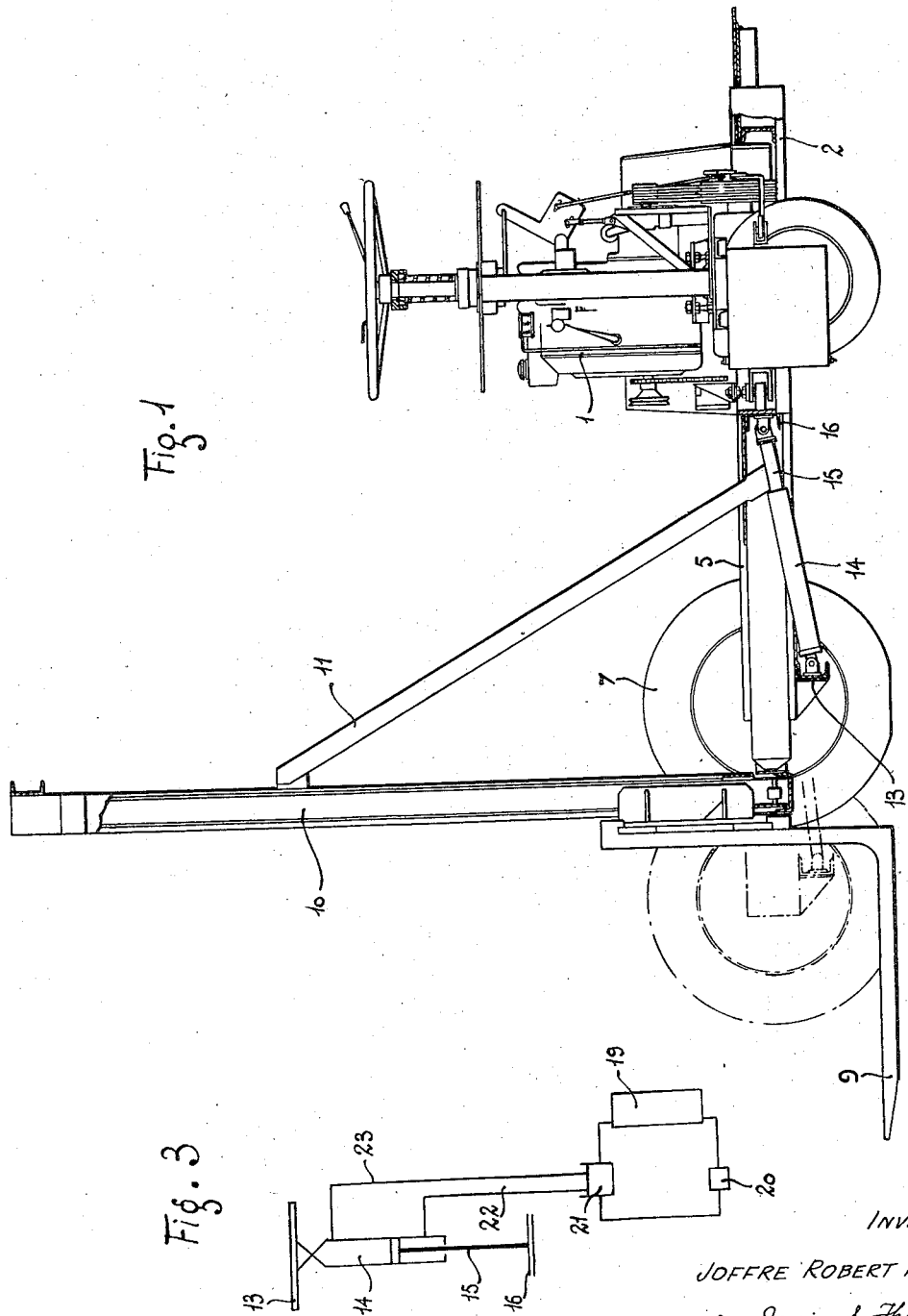
Figure 1 is a side elevation of one embodiment of the invention.
Figure 2:
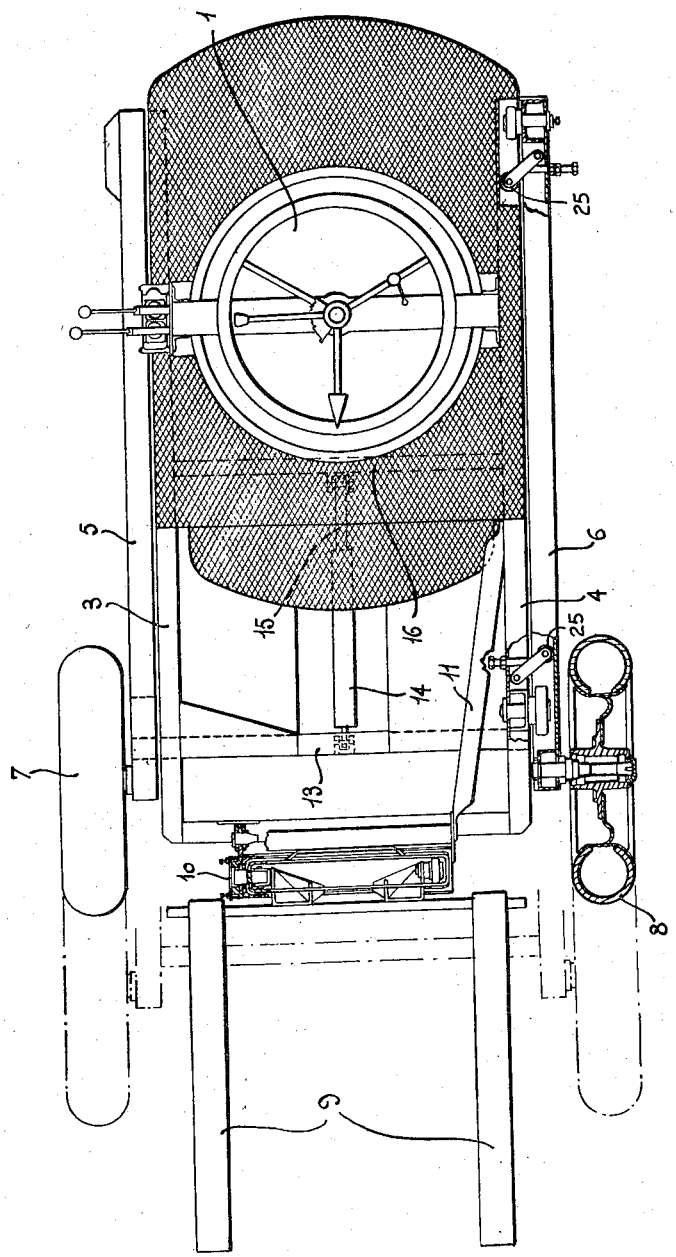
Figure 2 is a plan view.

In the embodiment illustrated, the device comprises a driving and steering unit 1 mounted on the chassis 2 and which will not be described in detail, being of a well-known type.

On each of the side-members 3, 4 forming the chassis proper, are mounted two U-irons 5, 6, which can slide longitudinally in relation to the side-members 3, 4, being mounted, for example by means of rollers 25, to reduce the friction. It is on these U-irons 5, 6 that the carrier wheels 7, 8 are mounted. At the front the device comprises the normal platform 9 movable along the mast 10 mounted on the side-members 3 and 4. The mast is maintained by shrouds 11.

If it is desired to move the two wheels 7, 8 simultaneously the two U-irons 5, 6 can be rigidly secured to one another by means of a transverse member such as 13 on which is pivotally mounted the cylinder 14 of a jack, the piston-rod 15 of said jack being itself pivotally mounted to a transverse member 16 fixed to the side-members 3, 4. It is thus clear that if a control fluid under pressure is sent into the jack by the distribution system which will be described hereinafter, the transverse member 13 and consequently the slideways 5, 6, will move away from or towards the transverse member 16, and consequently the wheel-base of the device will vary as desired by the user.

The jack is controlled by means of a control fluid contained in the reservoir 19, taken by the continuously acting pump 20 and passed into a distributor valve 21 which directs said fluid either into the reservoir 19 during periods of rest or into one of the conduits 22 or 23 according to whether it is desired to diminish or increase the wheel-base.

In the embodiment which has just been described, the variable wheel-base control is independent of the displacement control (lift and inclination) of the platform 9. Also, the wheel base may be increased, to increase the stability of the lifting truck, depending on the load carried and on the height to which the load is lifted.

While I have disclosed one embodiment of my invention herein in detail, other modifications may be made without departing from the spirit of my invention which is to be limited only by the following claims.

What I claim is:

1. A self-propelled lifting truck comprising a main chassis, a driving and steering wheel carried by the forward portion of the said main chassis, a mast with a vertically sliding platform carried by the rear portion of said main chassis, an engine group supported on said main chassis for driving said wheel and operating the mast and platform, an auxiliary chassis comprising elongated U-shaped channel members, load supporting wheels carried at one end of said auxiliary chassis, anti-friction means carried by the main chassis and slidable in said channel members, and power means interposed between the main chassis and the auxiliary chassis for telescopically sliding the auxiliary chassis with respect to the main chassis to vary the position of the two carrying wheels with respect to the mast on each side thereof.

2. A self-propelled lifting truck as set forth in claim 1, wherein the engine group includes a pump, a hydraulic distributor, and a hydraulic jack for telescopically moving the auxiliary chassis with the carrying wheels in relation to the main chassis.

References Cited in the file of this patent

UNITED STATES PATENTS

| | | |
|---|---|---|
| 1,621,555 | Miller | Mar. 22, 1927 |
| 1,799,307 | Manley | Apr. 7, 1931 |
| 2,258,180 | Hastings | Oct. 7, 1941 |
| 2,320,601 | Howell | June 1, 1943 |
| 2,428,223 | Johnson | Sept. 23, 1947 |
| 2,623,653 | Framhein | Dec. 30, 1952 |
| 2,667,985 | Woughter | Feb. 2, 1954 |